United States Patent
Watanabe et al.

(10) Patent No.: US 7,236,475 B2
(45) Date of Patent: Jun. 26, 2007

(54) USING SUBNET RELATIONS TO CONSERVE POWER IN A WIRELESS COMMUNICATION DEVICE

(75) Inventors: Fujio Watanabe, San Jose, CA (US); Jingjun Cao, Mountain View, CA (US); Shoji Kurakake, San Francisco, CA (US)

(73) Assignee: NTT DoCoMo, Inc., Tokyo (JP)

( * ) Notice: Subject to any disclaimer, the term of this patent is extended or adjusted under 35 U.S.C. 154(b) by 999 days.

(21) Appl. No.: 10/120,164

(22) Filed: Apr. 10, 2002

(65) Prior Publication Data

US 2003/0147364 A1  Aug. 7, 2003

Related U.S. Application Data

(60) Provisional application No. 60/354,568, filed on Feb. 6, 2002.

(51) Int. Cl.
*H04Q 7/00* (2006.01)
(52) U.S. Cl. .................................. 370/331; 455/436
(58) Field of Classification Search ............... 370/331, 370/335, 338, 349, 352, 436; 455/436, 437, 455/438, 439, 440, 441, 442, 443, 444, 445, 455/456.1, 456.5, 466
See application file for complete search history.

(56) References Cited

U.S. PATENT DOCUMENTS

| | | | |
|---|---|---|---|
| 5,428,664 A | 6/1995 | Kobayashi | 379/58 |
| 5,854,981 A * | 12/1998 | Wallstedt et al. | 455/439 |
| 6,295,450 B1 | 9/2001 | Lyer et al. | |
| 6,480,476 B1 * | 11/2002 | Willars | 370/311 |
| 6,747,961 B1 * | 6/2004 | Ahmed et al. | 370/328 |
| 2001/0034254 A1 * | 10/2001 | Ranta | 455/574 |
| 2002/0068595 A1 * | 6/2002 | Maggenti et al. | 455/519 |
| 2002/0151304 A1 * | 10/2002 | Hogan | 455/436 |

(Continued)

FOREIGN PATENT DOCUMENTS

EP  1 089 578 A2  9/2000

(Continued)

OTHER PUBLICATIONS

Becchetti, L., Priscoli, F.D., Inzerilli, T., Mahonen, P., Munoz, L., "Enhancing IP service provision over heterogeneous wirless networks: A path toward 4G," IEEE Communications Magazine, vol. 39, No. 8, pp. 74-81, Aug. 2001.

(Continued)

*Primary Examiner*—Brian Nguyen
(74) *Attorney, Agent, or Firm*—Edward C. Kwok; MacPherson Kwok Chen & Heid LLP

(57) ABSTRACT

A system and method for monitoring subnet relations in a wireless communication system is disclosed. A wireless communication device is provided and is located in a first subnet. When the wireless communication device executes a handoff to a second subnet, a mobility agent server notifies a virtual operator server of the handoff. As a result of the handoff, a subnet relation is created between the first subnet and the second subnet that is stored and later used to control how the wireless communication device uses power by placing network interface systems that cannot be used in a power-saving mode.

34 Claims, 8 Drawing Sheets

U.S. PATENT DOCUMENTS

2004/0202132 A1* 10/2004 Heinonen et al. ........... 370/331

FOREIGN PATENT DOCUMENTS

| EP | 1 339 250 A2 | 8/2003 |
|---|---|---|
| WO | WO 96/36190 | 11/1996 |
| WO | WO 97/32445 | 9/1997 |
| WO | WO 01/52567 | 7/2001 |
| WO | WO 01/72076 | 9/2001 |
| WO | WO 01/72076 A1 | 9/2001 |

OTHER PUBLICATIONS

Woesner, H., Ebert, J.P., Schlager, M., Wolisz, A., "Power-Saving Mechanisms in Emerging Standards for Wireless LANs: The MAC Level Perspective," IEEE Personal Communications, vol. 5, No. 3, pp. 40-48, Jun. 1998.

Zorzi, M., Rao, R.R., "Error Control and Energy Consumption in Communications for Nomadic Computing," IEEE Transactions on Computers, vol. 46, No. 3, pp. 279-289, Mar. 1997.

Funato, D., He, X., Williams, C., Takeshita, A., "Geographically Adjacent Access Router Discovery Protocol," Internet Draft, 16 pages, Dated Nov. 2001, Expires May 14, 2002.

T. Saito, W. Leland, "LIS (Logical IP Subnet) over ATM," 1996 IEEE International Conference On Communications (ICC). Converging Technologies For Tomorrow's Applications. Dallas, Jun. 23-27, 1996, pp. 398-404, XP000625704.

P. Mahonen, T. Saarinen, N. Passas, G. Orphanos, L. Munoz, M. Garcia, A. Marshall, D. Melpignano, T. Inzerilli, F. Lucas, M. Vitiello, "Platform-Independent IP Transmission Over Wireless Networks: The Wine Approach," IEEE Personal Communications, IEEE Communications Society, US, vol. 8, No. 66, Dec. 2001, pp. 32-40, XP001076793.

* cited by examiner

| CURRENTLY USER ATTACHES TO MAS | IT IS POSSIBLE FOR USER TO HANDOFF TO THE FOLLOWING MAS |
|---|---|
| MAS_1 | MAS_3 |
| MAS_2 | MAS_3, MAS_4 |
| MAS_3 | MAS_1, MAS_2, MAS_4, MAS_A, MAS_B |
| MAS_4 | MAS_2, MAS_3, MAS_C |
| MAS_A | MAS_3 |
| MAS_B | MAS_3 |
| MAS_C | MAS_4 |

Fig. 7

USING SUBNET RELATIONS TO CONSERVE POWER IN A WIRELESS COMMUNICATION DEVICE

This application claims the benefit under 35 U.S.C. §119(e) of Provisional U.S. Patent Application Ser. No. 60/354,568, filed on Feb. 6, 2002.

FIELD OF THE INVENTION

The present invention relates generally to wireless communication systems and, more particularly, to a system and method using subnet relations to conserve power in a wireless communication system.

BACKGROUND OF THE PRESENT INVENTION

Limiting the energy consumption of computers, especially portables, is becoming increasingly important. New energy-saving computer components and architectures have been and continue to be developed in different aspects such as circuit design, battery technology, semiconductor technology, and communication systems. The problem is to minimize energy consumption while not significantly impacting the effective performance of the wireless device.

Fourth-generation systems will likely not use a single standardized air interface, but a set of different technologies and standards. Additionally, the fixed network system will also be a part of future heterogeneous network systems. Therefore, an intensive effort to reduce power consumption is required.

Handheld portable devices are composed of a combination of digital, mixed signal, and even radio frequency circuits that together perform all of the functionality required to communicate across the heterogeneous wireless environment. The need to communicate with people using different types of equipment can only be solved with software reprogrammable radios. One software radio can communicate with many different radios with only a change in software parameters. Therefore, in a heterogeneous access environment, the software radio is a key technology to integrate multiple systems in a single device.

A typical portable device has an acceptable weight range between 4-12 oz. for most handheld applications based on human factor studies. The well-known nickel cadmium (NiCd) batteries, lithium-ion (Li-ion) batteries, and nickel metal hydride (NiMH) batteries are popular; however, multiple access systems need more powerful batteries and other technologies to reduce battery drain. Unfortunately, significant improvements in battery technology are not expected in the next few years because battery technology typically only doubles in performance in energy density roughly every 35 years.

One way to reduce energy consumption is to use and develop components that consume less power. Another way is to use components that can enter low power modes by temporarily reducing their speed or functionality. For this scheme, one strategy is to compress TCP/IP headers, which reduces their size by an order of magnitude, thereby reducing the wireless communication activity of a mobile client. Another way is to reduce the data transmission rate or stop data transmission altogether when the channel is bad, i.e., when the probability of dropped packets is high, so that less transmission time is wasted sending packets that will be dropped.

Another method is to use a medium access control protocol that dictates in advance when each wireless device may receive data. In addition, another strategy is to have servers or proxies use information about mobile client characteristics and data semantics to provide mobile clients with versions of data with reduced fidelity and smaller size, which reduces the amount of energy mobile clients must expend to receive the data. For example, a data server might convert a color picture to a black-and-white version before sending it to a mobile client. Of course, it is necessary to design applications that avoid unnecessary communication, especially in the expensive transmit direction.

As set forth above, a need exists for methods and systems that limit energy consumption of mobile clients that does not significantly impact the effective performance of the mobile clients.

SUMMARY OF THE INVENTION

The present invention discloses a method and system for creating a subnet relation map to approximate the physical access network topology. This will effect to conserve power in a wireless communication device. In this preferred embodiment, each wireless communication device has at least one network interface. As used herein, the term network interface should be broadly construed to include any type of device, together with its associated software, that may be used to connect a wireless communication device to a network. Remote terminals and personal digital assistants (PDA) can be equipped with several different types of network interfaces that are used to communicate with various types of wireless communication networks. The present invention allows the wireless communication device to place network interfaces that are not going to be used, which is based on the location of the wireless communication device and current available access networks, in a power-saving mode. The power-saving mode will reduce the power that is provided to a particular network interface or disable the network interface altogether.

In the preferred embodiment, a wireless communication network is provided that includes a plurality of subnets. Each subnet is preferentially located within a much larger access network that includes a plurality of subnets. During operations, a subnet relation database is used to determine what subnets the wireless communication device can access from a current subnet. Based on the information contained in the subnet relation database, network interfaces on wireless communication devices that cannot be used by the wireless communication device are placed in a power-saving mode or in a non-active mode.

The subnet relation database is preferentially located on a virtual operator server that is connected with a mobility agent server. Each subnet is connected to the mobility agent server that keeps track of the wireless communication device and connects the virtual operator server to the subnets, which, in turn, connects the virtual operator server to the wireless communication devices. The mobility agent server is operable to detect when a wireless communication device performs a handoff from one subnet to another subnet. The mobility agent server notifies the virtual operator server when a respective wireless communication device performs a handoff to another subnet.

Before the mobile device performs a handoff, the virtual operator looks to a subnet relation database to determine what other subnets the wireless communication device can handoff to from its current subnet. The virtual operator server is aware of what type of network interface the wireless communication device needs to communicate with each respective subnet within the wireless communication system. Once the subnet relation database is obtained, a message is sent to the wireless communication device from the virtual operator server that informs the wireless communication device, which network interfaces may be placed in the power-saving mode. If the user of the wireless communication device has an automatic configuration option, the wireless communication device will automatically place each network interface that cannot be used in a power-saving mode. To create the subnet relation database, a binding update message is used that informs the virtual operator server of IP address changes. To track the binding update message, the subnet relation database is created.

The subnet relation database includes connectivity information for each subnet in the plurality of subnets. Connectivity information refers to information that identifies each subnet that the wireless communication device can perform a handoff with the subnet in which they are currently operating. For example, if a wireless communication device is in subnet A, the virtual operator server knows that the wireless communication device can only handoff to, for instance, subnets D, E and F because the subnet relation database contains information that indicates this fact. As such, if the wireless communication device includes a network interface that only works with subnet C, the wireless communication device can place this network interface in a power-saving mode or switch off. This is because there is no need to have it operating since the wireless communication device cannot possibly access subnet C from its current location.

Another embodiment of the present invention discloses a method of monitoring subnet relations in a wireless communication system. In this embodiment, a wireless communication device is provided that is located in a first subnet. A handoff detection application is used to detect when the wireless communication device executes a handoff to a second subnet within the wireless communication system. When the wireless communication device performs the handoff, a subnet relation is created between the first subnet and the second subnet because the second subnet is within radio range of the first subnet and the wireless communication device can perform a handoff to the second subnet. After the subnet relation is created, it is stored in a subnet relation database.

In this preferred embodiment, a mobility agent server is notified when the wireless communication device makes the handoff. A mobility agent notifies a virtual operator of the handoff to the second subnet. The virtual operator server is used to create and store the subnet relation. As such, in the preferred embodiment of the present invention the subnet relation is stored in a subnet relation database located on the virtual operator server. Those skilled in the art should recognize that there would be a large amount of subnet relations stored in the subnet relation database. Every respective subnet in the wireless communication network will have a list of other subnets that they have a subnet relation with so that the virtual operator server can assist the wireless communication device in conserving power.

Another preferred embodiment of the present invention discloses a subnet relationship monitoring system for a wireless communication network. The present preferred embodiment has a wireless communication device that includes at least one network interface. The network interfaces connect the wireless communication device to a plurality of subnets. At least one mobility agent server is connected to predetermined subnets within the plurality of subnets. A virtual operator server is connected to each mobility agent server. A subnet relation database is located on the virtual operator server. During operation, the virtual operator server is operable to use the subnet relation database to determine which network interfaces on the wireless communication device should be active or powered up when the wireless communication device is located in a specific subnet.

Yet another preferred embodiment of the present invention discloses a method for managing subnet relations in a wireless communication device that has at least one network interface. In this preferred embodiment, a plurality of access networks is provided that include at least one subnet. The wireless communication device is connected to a respective subnet. The next step in the preferred method is to determine to which subnets the wireless communication device is capable of performing a handoff from the respective subnet it currently occupies. Each network interface that cannot be used by any of the surrounding subnets is then placed in a power-saving mode.

Further objects and advantages of the present invention will be apparent from the following description, reference being made to the accompanying drawings wherein preferred embodiments of the invention are clearly illustrated.

BRIEF DESCRIPTION OF THE DRAWINGS

FIG. 7 is a table illustrating subnet relationships between respective mobility agent servers based on the subnet relation map illustrated in FIG. 6.

DETAILED DESCRIPTION OF THE PRESENTLY PREFERRED EMBODIMENTS OF THE INVENTION

Figure 1:
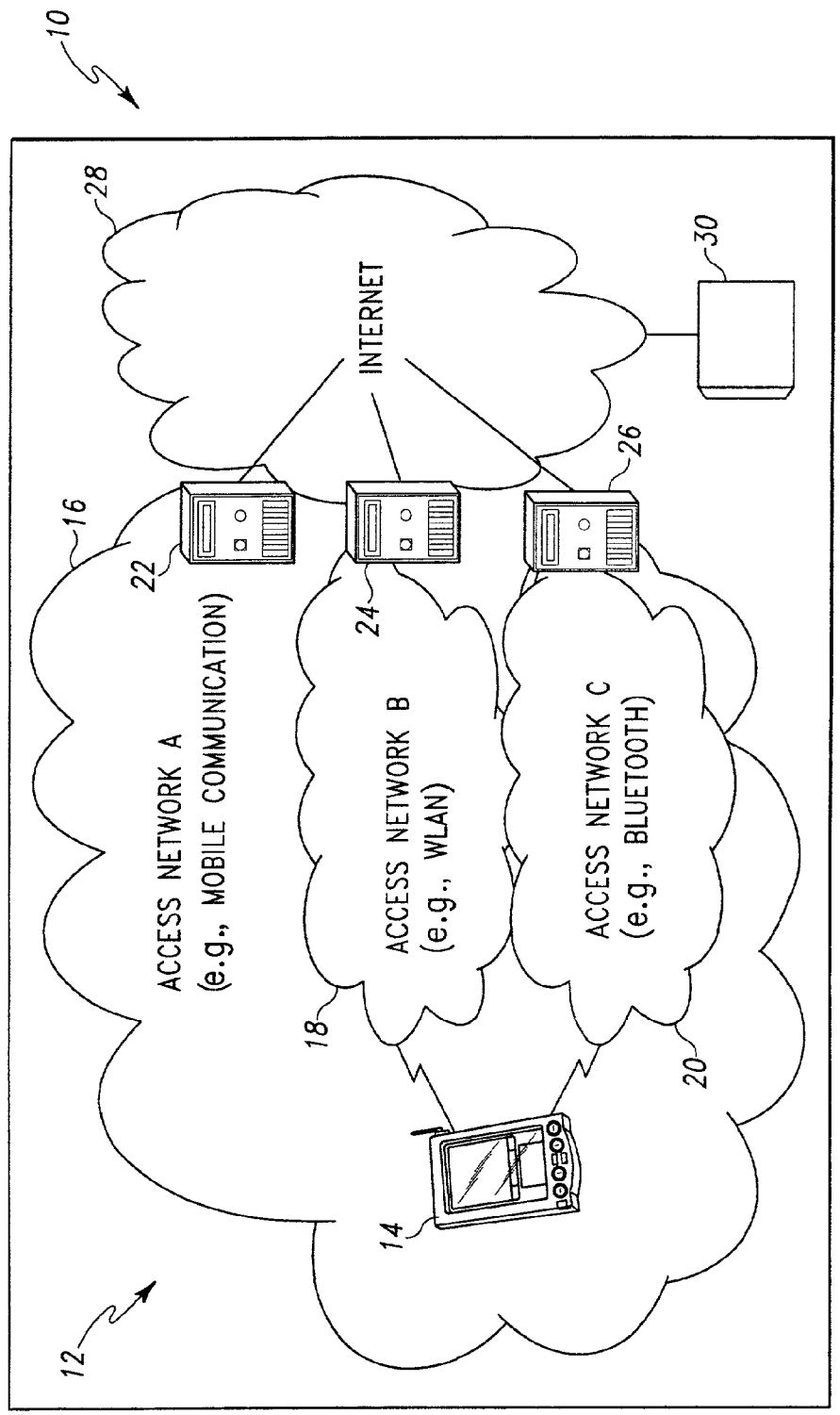
FIG. 1 illustrates a wireless communication system that includes a plurality of subnets.

Referring to FIG. 1, a preferred embodiment of the present invention includes a wireless communication network 10 that has an IP subnet 12. As set forth in greater detail below, a mobility agent server (MAS) creates the IP subnet 12. In the preferred embodiment, the IP subnet 12 includes at least one wireless communication device 14 that is capable of being connected to a plurality of access networks 16, 18, 20. Each access network 16, 18, 20 preferentially includes a server 22, 24, 26 that is connected to an Internet connection 28. Although not illustrated, those skilled in the art would recognize that the servers 22, 24, 26 are connected to base stations that communicate with the wireless communication devices 14. Each respective server 22, 24, 26 is also connected to a virtual operator server 30 by means of the Internet connection 28. Although not illustrated in FIG. 1, the mobility agent server within each access network 16, 18, 20 is connected to the servers 22, 24, 26 as well.

Figure 2:
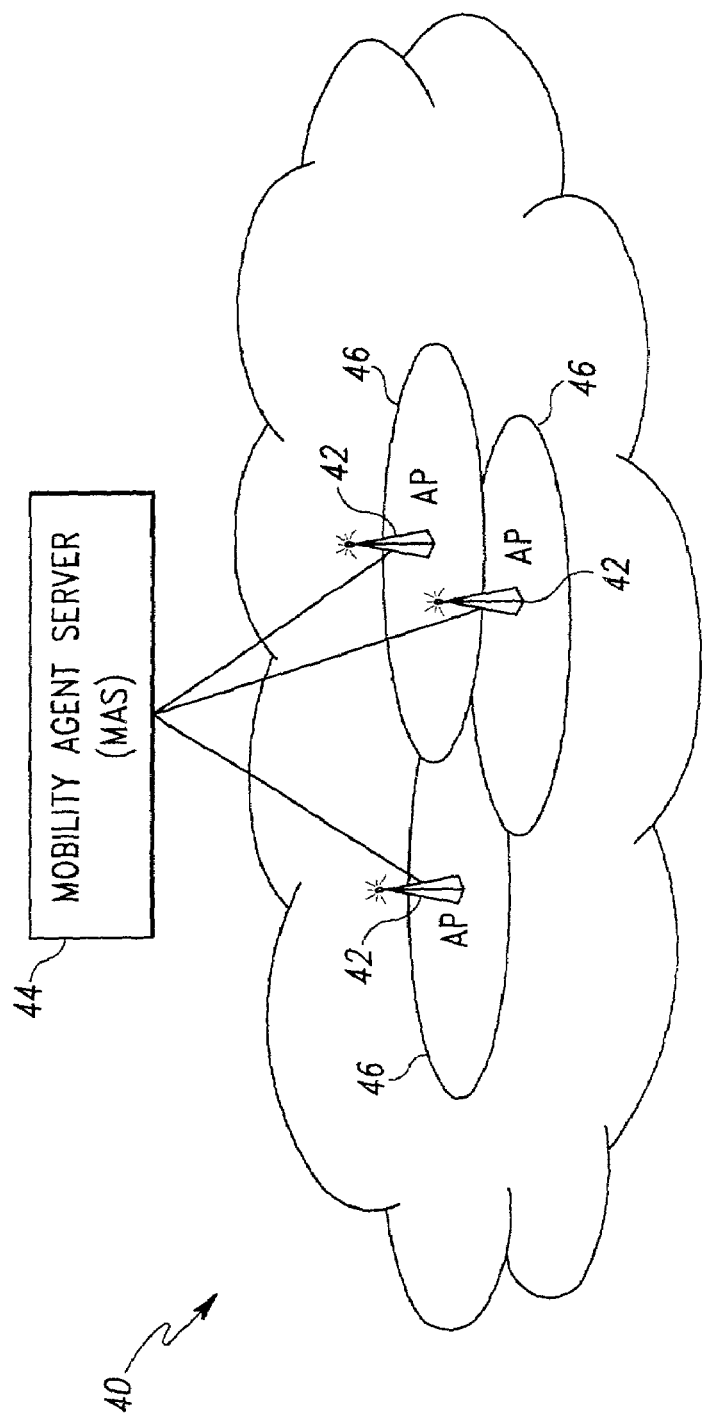
FIG. 2 illustrates a homogeneous wireless access network per the mobile agent.

The present invention is capable of working on both homogeneous and heterogeneous access networks. As illustrated in FIG. 2 as it relates to the present invention, a homogeneous access network 40 would comprise a wireless communication system that includes a plurality of access points 42. Each access point 42 of the access network 40 is connected to the MAS 44. Although not illustrated, each access point 42 is connected to the server by way of the MAS 44. As further illustrated in FIG. 2, each access point 42 has a predefined coverage area that is represented by area 46.

Figure 3:
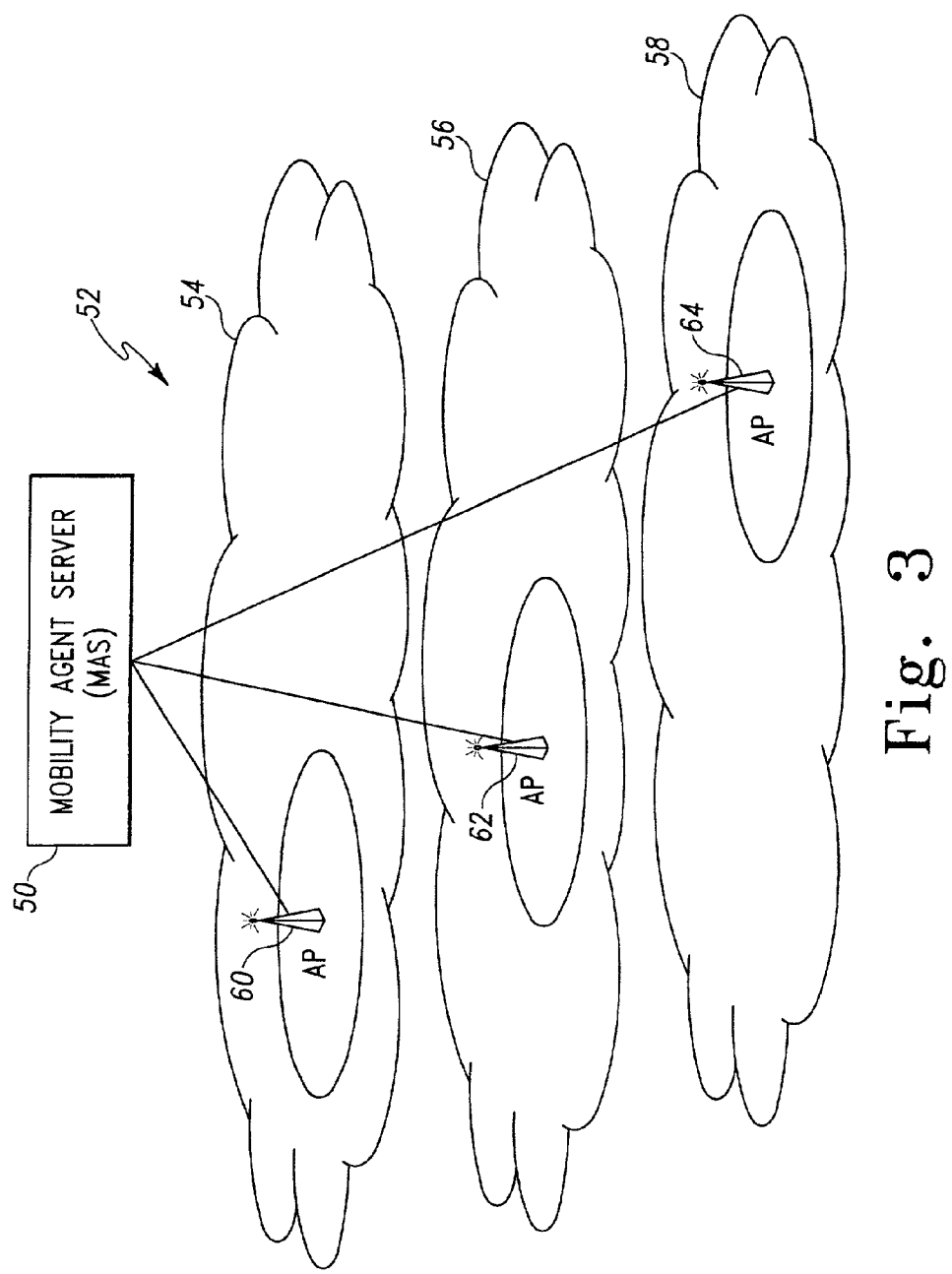
FIG. 3 illustrates a heterogeneous wireless access network per the mobile agent.

Referring to FIG. 3, a second MAS 50 is connected to a heterogeneous access network 52. As clearly illustrated, a heterogeneous access network 52 is made up of a plurality of access networks 54, 56, 58. As illustrated, each respective access network 54, 56, 58 represents a different or diverse type of network from the other and also includes at least one access point 60, 62, 64. In the case of a heterogeneous access network 52, the second MAS 50 is connected to each access point 60, 62, 64, which operate in different access networks 54, 56, 58. Although not specifically illustrated as such in FIG. 3, the access networks 54, 56, 58 can be wireless or wired access networks.

Figure 4:
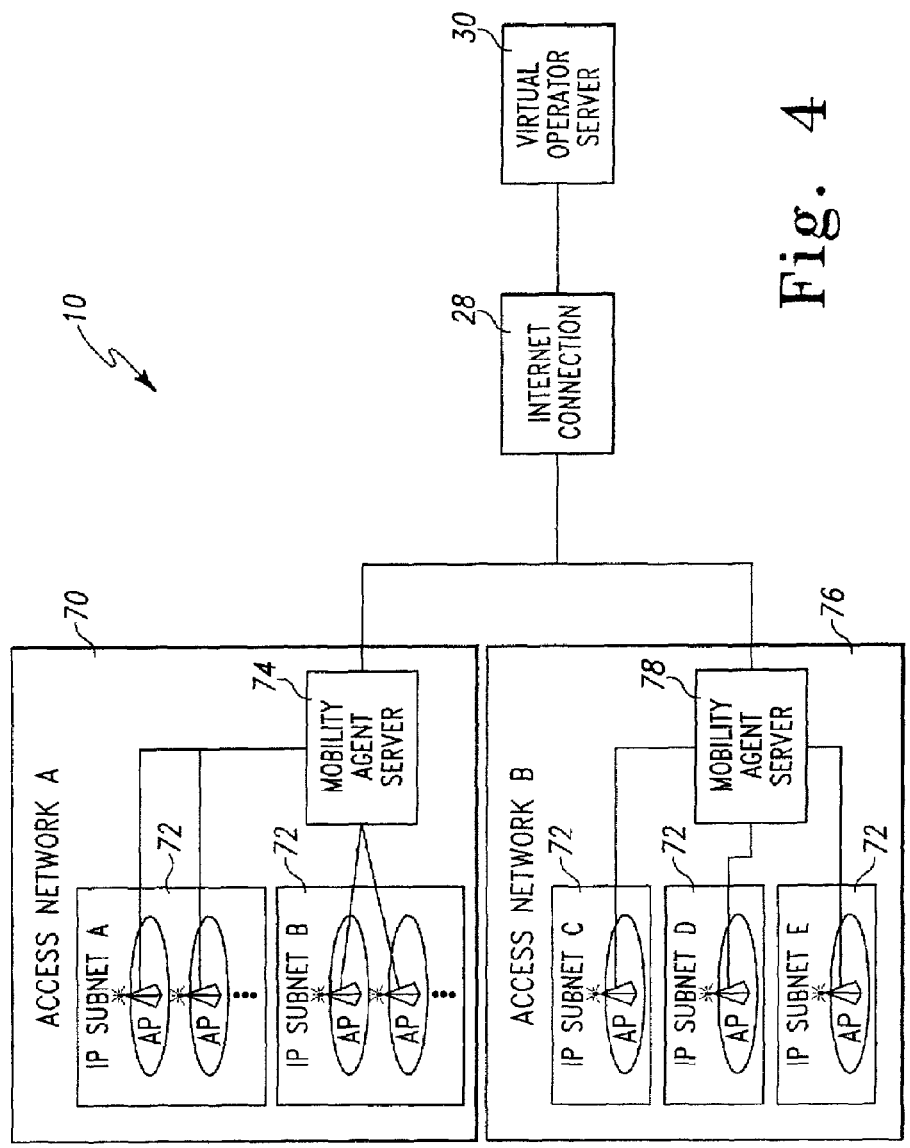
FIG. 4 illustrates a wireless communication system that includes a subnet relation system.

Referring to FIG. 4, which sets forth a general diagram of a preferred wireless IP network 10 used in the present invention, location information is important to manage users in wireless IP networks 10. During operation, the virtual operator server 30 establishes a subnet relation map or database that is based on handoff experience. To complete the subnet relation map, the virtual operator server 30 tracks IP subnet changes when wireless communication devices 14 move from one subnet to another subnet. This movement is generally referred to as a handoff Subnets are generally assumed to be close to each other when the wireless communication devices 14 can perform a handoff.

As illustrated in FIG. 4, a first access network 70 includes a plurality of IP subnets 72 that are connected to a first MAS 74. Although not specifically illustrated in this figure, it should be noted that there may be more than one MAS in each access network and, as such, the use of one MAS in each access network is for illustrative purposes only and should not be construed as a limitation of the present invention. The second access network 76 also includes a plurality of IP subnets 72 that are connected to a second MAS 78. In this preferred embodiment, each MAS 74, 78 is preferentially connected to an Internet connection 28 that, in turn, connects each MAS 74, 78 with the virtual operator server 30.

Figure 5:
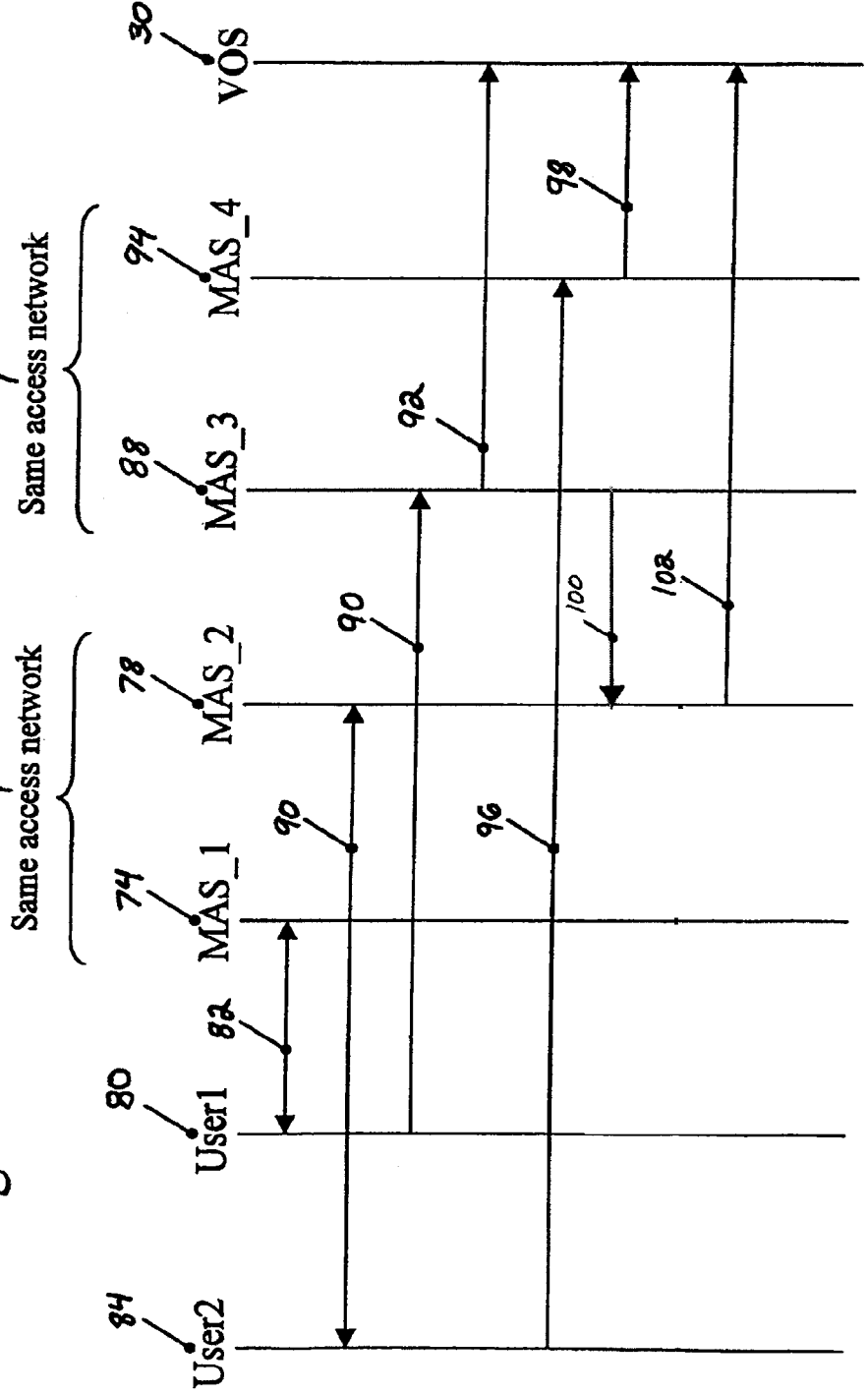
FIG. 5 illustrates user handoffs between access networks that include a mobility agent server.

Referring to FIG. 5, during operation, a first user 80 has a global address assigned by the virtual operator server 30. The first user 80 also has a connection (arrow 82) to the first MAS 74, which is located in the first access network 70. A second user 84 also has a global address assigned by the virtual operator server 30 and connects (arrow 86) to the second MAS 78, which is also located in the first access network 70. When the first user 80 performs a handoff from the first MAS 74 to a third MAS 88, the first user 80 will register its global address to the third MAS 88 (see the arrow 90). The third MAS 88 is located in the second access network 76. At the same time, the third MAS 88 will update the MAS-global address mapping of the first user 80 at the virtual operator server 30 (arrow 92).

When the second user 84 performs a handoff from the second MAS 78 to a fourth MAS 94 (arrow 96), the fourth MAS 94 also updates the MAS-global address mapping at the virtual operator server 30 (arrow 98). If the first user 80 performs another handoff from the third MAS 88 to the second MAS 78 (arrow 100), then the MAS-global address mapping will be updated at the virtual operator server 30 (arrow 102).

In the preferred embodiment of the present invention, the virtual operator server 30 keeps track of a plurality wireless communication devices 14 as they handoff from MAS to MAS. Generally speaking, if one MAS is too far from another MAS, it would be impossible for the user of a wireless communication device 14 to handoff to the distant MAS. Consequently, the ability to handoff usually indicates that each IP subnet is located close to each other so that there is some overlap in coverage areas. As such, the virtual operator server 30 is capable of mapping out the respective interconnections amongst subnets within a fullscale wireless IP network 10. As such, the virtual operator server knows what subnets are located in a respective geographic location that are capable of being accessed by wireless communication devices 14.

Figure 6:
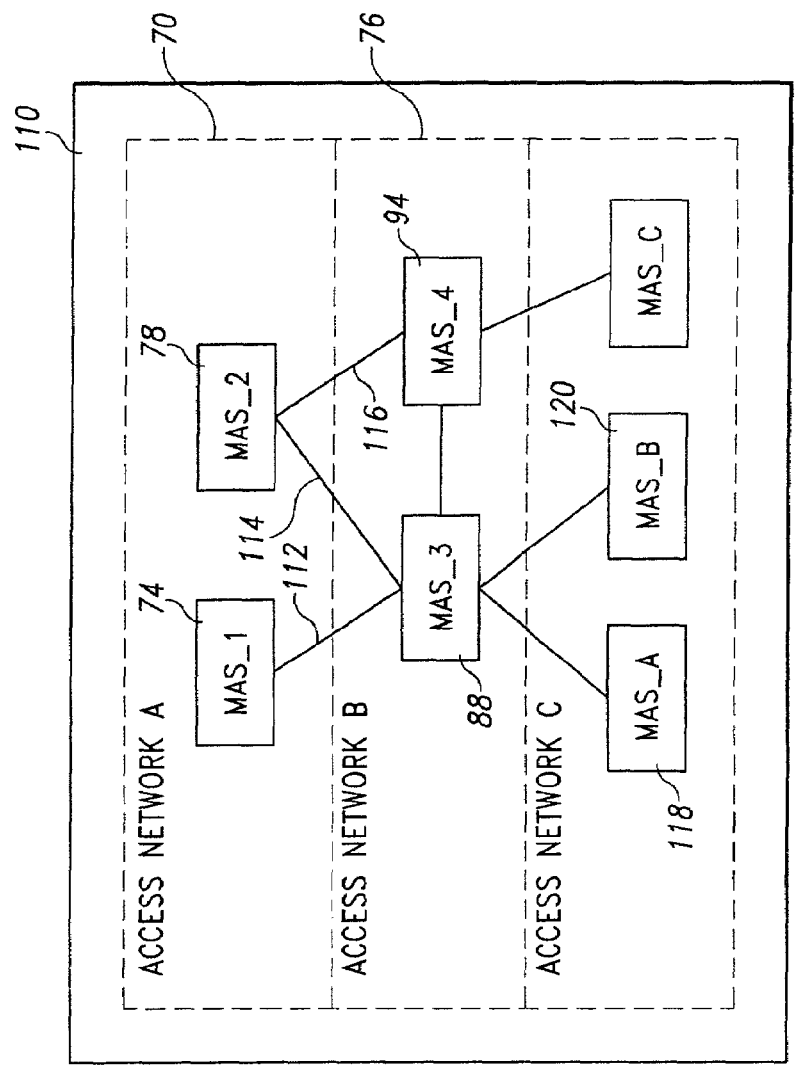
FIG. 6 illustrates an example of a subnet relation map.

Referring to FIG. 6, during operation, the virtual operator server 30 tracks subnet relations by handoff experience and creates a subnet relation map 110. In the example set forth above, the subnet relation map 110 shows that the first MAS 74 has a subnet relation 112 with the third MAS 88, because the first user 80 is capable of handing off from the first MAS 74 to the third MAS 88. Furthermore, the first user 80 is capable of handing off from the third MAS 88 to the second MAS 78, thereby creating another subnet relation 114. Subnet relation 116 is created by the fact that the second user 84 is capable of handing off from the second MAS 78 to the fourth MAS 94.

The subnet relation map 110 illustrated in FIG. 6 represents only a small piece of the total number of access networks that would be connected to the virtual operator server 30. As such, the subnet relation map 110 should be viewed in an illustrative sense and not as a limitation of the present invention. From this subnet relation map 110, it is illustrated that the first MAS 74 has the ability to handoff to the third MAS 88. In turn, the third MAS 88 has the ability to handoff to the first MAS 74, the second MAS 78, the fourth MAS 94, a fifth MAS_A 118 and a sixth MAS_B 120. FIG. 7 illustrates all of the subnet relations that are possible for each MAS in the example set forth in FIG. 6.

As it relates to the preferred embodiment of the present invention, knowing this information gives the virtual operator server 30 the ability to assist the wireless communication device 14 in its efforts to reduce power consumption. In one preferred embodiment, the wireless communication device 14 could shut down the network interface that is associated with a particular type of subnet or set the network interface into a sleep mode. Either of these options allows the wireless communication device 14 to conserve energy by reducing or eliminating power consumption that is associated with network interfaces.

Figure 8:
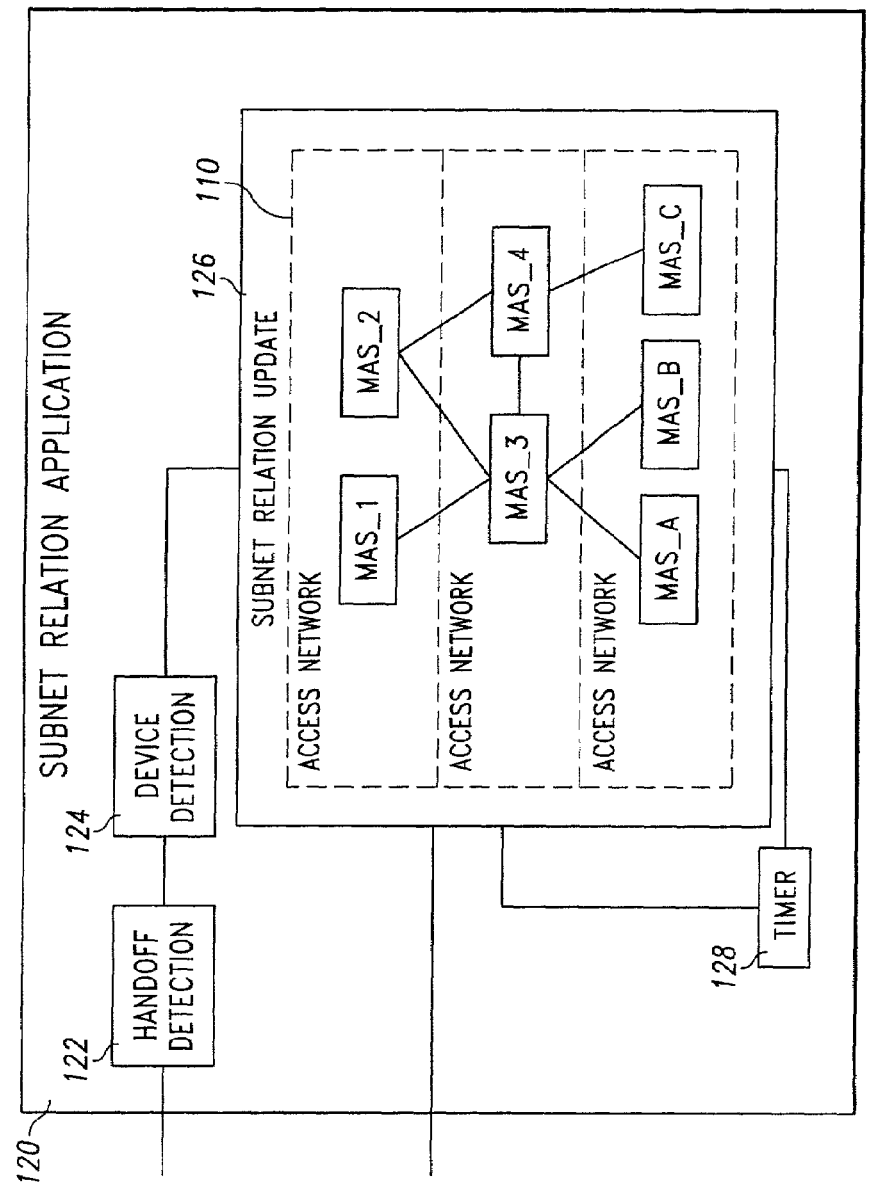
FIG. 8 illustrates the preferred subnet relation map application.

FIG. 8 illustrates a preferred subnet relationship application 120 that creates the subnet relation map 110, which is located on the virtual operator server 30. At first, a handoff is detected by a handoff detection application 122. The handoff detection application 122 preferentially identifies subnet handoffs, which means that the IP address assigned by the MAS has changed because the wireless communication device 14 has moved from a current MAS territory to another MAS territory. In addition, this detection includes that this IP address change is triggered by the handoff.

If a handoff is detected, the preferred embodiment of the present invention also determines whether or not the wireless communication device 14 initiated the handoff or some other source. Since the same wireless communication device 14 may use a different IP address at different access networks, it is necessary to know whether the wireless communication device 14 initiated the handoff in order to create a more accurate subnet relation map 110; especially when the wireless communication device 14 has two or more access network interfaces, as each access network interface may have a different IP address.

After determining whether or not the user initiated the handoff, a subnet relation update application 126 is used to update the subnet relation map 110 based on the handoff. The subnet relation does not necessarily indicate a physical location, but indicates the logical relation between all of the subnets. Therefore, the virtual operator server 30 creates and maintains the subnet relation map 110 based only on subnet changing information (subnet handoff information). After the virtual operator server 30 has some handoff experience, the subnet relation map 110 becomes relatively stable. However, it is necessary to update the subnet relation map 110 because some subnets can be instantaneously attached to an access network and also removed from the access network.

For instance, a wireless LAN access network 18 may be attached to the wireless network 12 and removed from the wireless network 12. This movable case will happen especially in private networks. Therefore, in order to keep the accuracy of the subnet relation map 110, a timer 128 may be used to ensure that the subnet relation map 110 is accurate. For instance, if the handoff occurred one day ago, the subnet relation is likely still accurate even under a private network. However, if the handoff has not occurred for one year, the subnet relation may not be as clear, especially in the case of a private network.

While the invention has been described in its currently best-known modes of operation and embodiments, other modes, embodiments and advantages of the present invention will be apparent to those skilled in the art and are contemplated herein.

What is claimed is:

1. A method for facilitating handoffs for a wireless communication device operating in an Internet Protocol (IP) based network and having at least one network interface, comprising:
   providing a wireless communication system including a plurality of network attachment points;
   attaching said wireless communication device to a first network attachment point;
   when said wireless communication device moves from an area served by said first network attachment point to an area served by a second network attachment point, performing a handoff from the first network attachment point to the second network attachment point and based on a successful completion of the handoff, creating an adjacency relation in an adjacency relation database to reflect the proximity between an IP subnet of said first network access point and an IP subnet of said second network access point;
   using said adjacency relation database to determine other network attachment points said wireless communication device can access from said area served by said second network attachment point.

2. The method of claim 1, wherein said adjacency relation database is located on a network operator server.

3. The method of claim 1, wherein each network attachment point is associated with a mobility agent server that monitors said wireless communication device.

4. The method of claim 1, further comprising notifying a mobility agent server associated with said second network attachment point of said handoff, whereupon said mobility agent server causes said adjacency relation to be created.

5. The method of claim 4, wherein said mobility agent notifies a network operator server of said handoff.

6. The method of claim 4, wherein said wireless communication device is assigned a global address, and wherein, during said handoff, said wireless communication device registers said global address with said mobility agent server.

7. The method of claim 6, wherein said adjacency relation database resides in a network operator server, and wherein, upon registration, said mobility agent server provides said global address to said network operator server.

8. The method of claim 6, wherein said handoff occurs between network attachment points of different access networks.

9. The method of claim 1, further comprising sending a message from a network operator server to said wireless communication device that informs said wireless communication device which network interfaces may be activated.

10. The method of claim 1, wherein said adjacency relation database includes connectivity information for each network attachment point among said plurality of network attachment points.

11. The method of claim 10, wherein said connectivity information comprises each network attachment point to which said wireless communication device can handoff from said second network attachment point.

12. The method of claim 1, further comprising activating a network interface if said wireless communication device performs a handoff to another network attachment point for which said wireless communication device could use said network interface.

13. A method of monitoring adjacency relations in an Internet Protocol (IP) based wireless communication system, comprising:
   providing a wireless communication device located in an area served by a first network attachment point;
   detecting when said wireless communication device executes a handoff to a second network attachment point;
   Upon detecting that the handoff is successfully performed, creating an adjacency relation between an IP subnet of said first network attachment point and an IP subnet of said second network attachment point; and
   storing said adjacency relation.

14. The method of claim 13, further comprising notifying a mobility agent server when said wireless communication device makes said handoff.

15. The method of claim 14, further comprising notifying a network operator server of said handoff to said second network attachment point.

16. The method of claim 15, wherein said network operator server creates said adjacency relation.

17. The method of claim 14, wherein said wireless communication device is assigned a global address, and wherein, during said handoff, said wireless communication device registers said global address with said mobility agent server.

18. The method of claim 17, wherein said adjacency relation is stored in an adjacency relation database residing in a network operator server, and wherein, upon registration, said mobility agent server provides said global address to said network operator server.

19. The method of claim 18, wherein said handoff occurs between network attachment points of different access networks.

20. The method of claim 13, wherein said adjacency relation is stored in an adjacency relation database.

21. An adjacency relationship monitoring system for a wireless communication system operating in an Internet Protocol (IP) based network, comprising:
- a wireless communication device with at least one network interface for connecting to a plurality of network attachment points;
- at least one mobility agent server associated with predetermined network attachment points within said plurality of network attachment points;
- a network operator server connected to each mobility agent server; and
- an adjacency relation database located on said network operator server adjacency IP subnet, wherein said adjacency relation database is updated according to ongoing handoff experience, and wherein said network operator server uses said adjacency relation database to determine which network interfaces on said wireless communication device are active when said wireless communication device is served by a specific network attachment point.

22. The adjacency relationship monitoring system of claim 21, wherein said adjacency relation database contains connectivity information for attachment point in said wireless communication system.

23. The adjacency relationship monitoring system of claim 22, wherein said information comprises each network attachment point to which said wireless communication device can to from within the area served by said specific network attachment point.

24. The adjacency relationship monitoring system of claim 21, wherein non-active network interfaces are placed in a power-saving mode by said wireless communication device.

25. The adjacency relationship monitoring system as in claim 21 wherein said wireless communication device is assigned a global address and wherein, during a handoff from a first network attachment point to a second network attachment point, said wireless communication device deregisters said global address from a mobility agent server associated with said first network attachment point and registers said global address with a mobility agent of said second network attachment point.

26. The adjacency relationship monitoring system as in claim 25, wherein, upon registration, said mobility agent server of said second network adjacent point provides said global address to said network operator server.

27. The adjacency relationship monitoring system of claim 26, wherein said first and second network attachment points are associated with different access networks.

28. A method for managing adjacency relations for a wireless communication device operating in an Internet Protocol (IP) based network and having at least one network interface, comprising:
- providing a plurality of access networks that each include at least one network attachment point;
- connecting said wireless communication device to a network attachment point; and
- using an adjacent relation database maintained according to handoff experience, wherein the adjacent relation database, which relates adjacent IP subnets, is updated when a handoff is successfully completed, to determine which surrounding network attachment points that said wireless communication device is capable of performing a handoff are available from an area served by said network attachment point.

29. The method of claim 28, wherein each network attachment point within said access networks is associated with a mobility agent server.

30. The method of claim 29, wherein each mobility agent server is connected to a network operator server.

31. The method of claim 30, wherein each said network operator server is responsible for generating a signal that is transmitted to said wireless commumcation device to place each network interface in a power-saving mode.

32. The method of claim 28 wherein said wireless communication device is assigned a global address and wherein, during said handoff, said wireless communication device deregisters said global address from one network attachment point and registers said global address with another network attachment point.

33. The method of claim 32, wherein each network attachment point is associated with a mobility agent server, and wherein, upon registration, said mobility agent associated with said another network attachment point causes an adjacency relation to be created and stored in an adjacency relation database residing in a network operator server, and provides said global address to said network operator server.

34. The method of claim 33, wherein said handoff occurs between network attachment points of different access networks.

* * * * *